Sept. 15, 1970  E. B. BYAM  3,528,270
THREAD ROLLER

Original Filed Nov. 10, 1966

INVENTOR
Erwin B. Byam
BY Dedio and Montgomery
ATTORNEYS

Sept. 15, 1970  E. B. BYAM  3,528,270
THREAD ROLLER

Original Filed Nov. 10, 1966  7 Sheets-Sheet 5

INVENTOR
Erwin B. Byam

BY De Lio and Montgomery
ATTORNEYS though the United States Patent Office
3,528,270
Patented Sept. 15, 1970

3,528,270
THREAD ROLLER
Erwin B. Byam, Wolcott, Conn., assignor to Textron, Inc., Providence, R.I., a corporation of Delaware
Continuation of application Ser. No. 593,542, Nov. 10, 1966. This application Feb. 10, 1969, Ser. No. 802,723
Int. Cl. B21h 3/06, 9/02
U.S. Cl. 72—90          10 Claims

ABSTRACT OF THE DISCLOSURE

A thread rolling machine for machining a workpiece between a first and second die, wherein one of the dies is stationary and the other is movable. The workpieces are fed to the dies by a chute whose axis lies in straight line, wherein the top surfaces of the chute lie in substantially the same plane as the surfaces of the dies. The axis of the chute forms an angle of between 30–60° with respect to the die line of the dies and the top surfaces of the chute are at an angle of 27–35° with respect to the horizontal. The machine further includes a chute cover, injector means for closing the chute, and starter means for positioning the workpiece between the dies.

---

This invention relates to thread rolling machines for rolling screw threads and the like and more particularly to improvements for such machines to facilitate an increase in their speed of operation.

A large proportion of the standard bolts and screws manufactured have their threads formed by being rolled between suitable dies. At the present time there are principally two different methods employed in the rolling of threads. With one of these methods the bolt is rolled between two flat dies, each die being provided with parallel grooves cut to the size and shape of the thread. One die is held stationary while the other die reciprocates and rolls the blanks between the dies. Each die has impressed in its surface a series of angular parallel lines. As the workpiece is forcibly rolled between the dies the threads will be rolled into the workpiece.

The other principal process employs three grooved rollers held in a radial position with reference to the stock. In appearance, the die used resembles an ordinary die head with circular chasers. As the stock is fed between the rolling dies under pressure the metal is forced into the grooves of the dies, thus forming the threads.

The instant invention is concerned with the first-mentioned method and is principally concerned with providing means for facilitating the transfer of blanks from a chute to the die. Additionally, this invention provides means for adjustably controlling the movement of the workpiece or blank within the chute as it is being guided toward the dies. This invention is further concerned with means for sequentially controlling the presentation of a workpiece held in a chute to a die. Furthermore, this invention is directed to the provision of means for adjusting the position of the dies with respect to each other.

The major problem in any thread roller of the type described herein is to present the blank to the dies with the underside of the blank head always parallel to the chute and the dies.

The approach to this problem in the past has been to present the blank aligned to the dies but offset a distance parallel to the die line. Thereafter the blank is transferred to the die line and pushed into the dies. Due to the length of these motions the transfer of the workpiece becomes a limiting speed factor. There have been other approaches to the increasing of the speed factor of operation. These also have resulted in machines which, although adequate for the job, were not completely adaptable to operating at fast rates.

Accordingly, the principal object of this invention is to provide a new and improved thread roller machine.

Another object of this invention is to provide a new and improved thread roller machine having improved means for feeding a workpiece to the die.

Another object of this invention is to provide a new and improved thread roller capable of operating at high rates of speed.

A further object of this invention is to provide a thread roller machine having the tops of the chute and the dies all in the same plane.

A still further object of this invention is to provide a new and improved thread roller machine having a chute which is substantially perpendicular to the surface supporting the machine so that there will be substantially no side binding of the workpiece while it is in the chute as it approaches the dies.

Yet another object of this invention is to provide a new and improved thread roller machine having means for ejecting workpieces which become lodged between the dies during rolling.

Still other objects and advantages of the invention will in part be obvious and will in part appear hereinafter.

The invention accordingly comprises the features of construction, combination of elements and arrangement of parts which will be exemplified in the construction hereinafter set forth and the scope of the invention will be indicated in the claims.

For a fuller understanding of the invention, reference is had to the following description, taken in conjunction with the accompanying drawings, in which.

Figure 1:
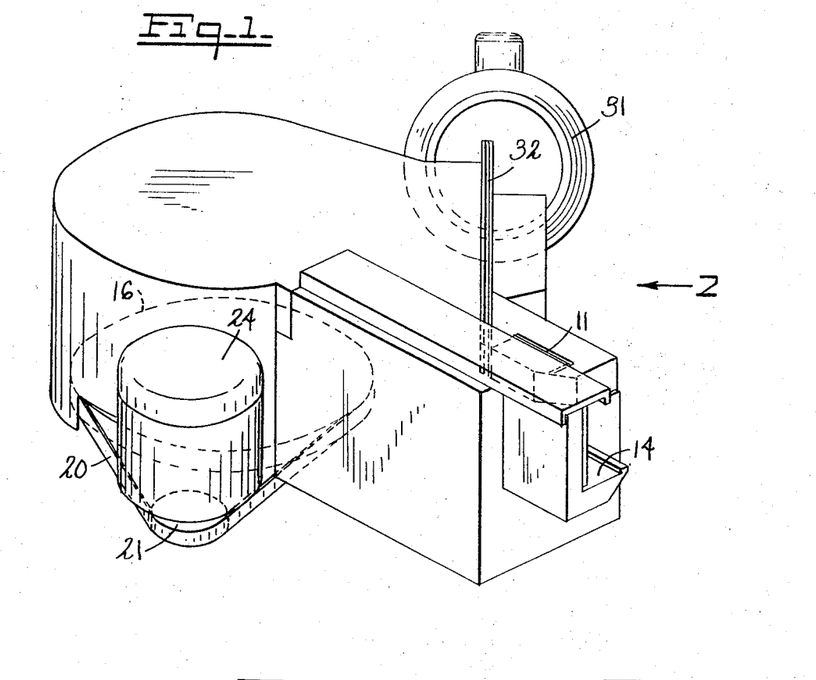
FIG. 1 is a perspective view showing the thread roller machine according to the invention.
Figure 2:
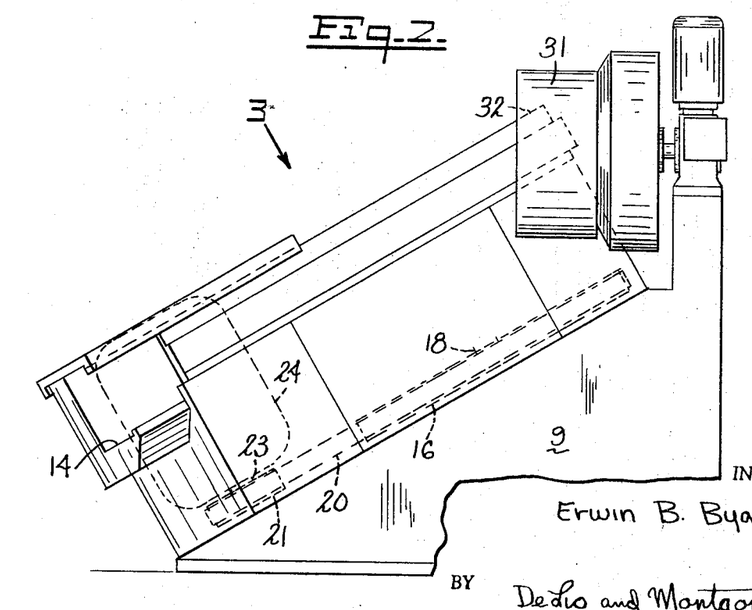
FIG. 2 is a side view looking in the direction of the arrow 2 of FIG. 1 showing the thread roller machine according to the invention.
Figure 3:
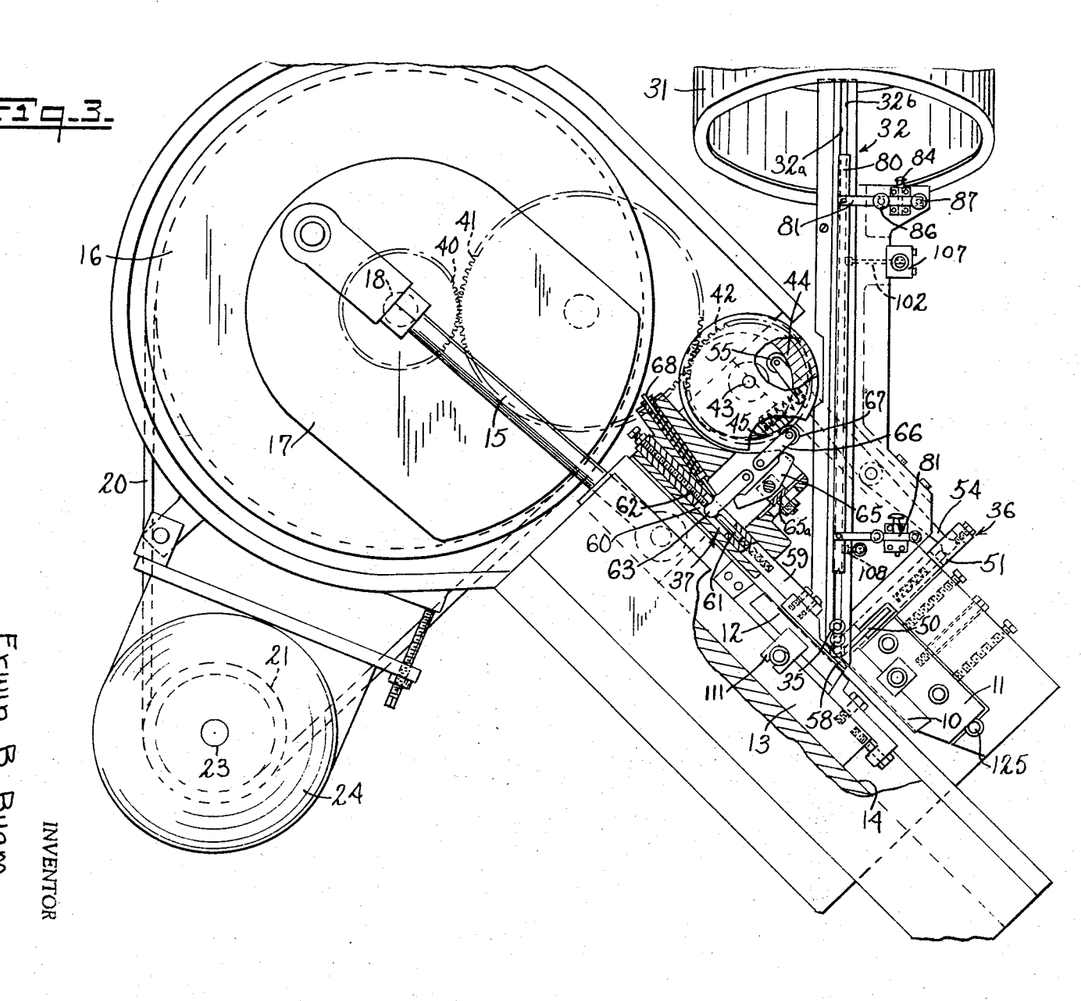
FIG. 3 is a top view partially in section taken from the vantage of the arrow 3 shown in FIG. 2.

Referring to FIGS. 1–3, the mechanism to be described herein is mounted on a frame or base 9 which is capable of being supported by a surface, such as a floor. Supported by the frame 9 is a first stationary die 10 clamped to a die block 11. A movable die 12 is shown clamped to a gate 13 which is slidably movable within a guide channel 14 formed in the frame. By reciprocating the gate, the die 12 having raised portions therein in the shape of the thread to be rolled on the workpiece, may be moved past the die 10 to form the thread in a workpiece.

The die 12 is reciprocated by the provision of a pitman 15 driven by a flywheel 16 through a counterweight 17 mounted on a shaft 18 supporting the flywheel. The flywheel 16 is driven through a belt drive 20 mounted on a drive pulley 21 which in turn is driven by the rotation of a motor shaft 23 of a motor 24.

The workpiece is fed to the dies 10 and 12 by the provision of a hopper shown at 31 and a chute shown at 32. As may be seen in FIG. 3, the chute 32 is so positioned that it is at an angle of approximately 30 to 60 degrees with respect to the die line. Preferably, the chute is at an angle of 45 degrees, as shown in the drawings. The die line is substantially that surface of the stationary die which generates the root of the thread on the workpiece. As may be seen in FIGS. 2 and 3, the tops of the dies and the chute are preferably positioned in a common plane. The chute side walls shown at 32a and 32b are mounted preferably substantially perpendicular to the surface supporting the frame 9 so that there will be no side bending of a workpiece shown at 35 in the chute prior to its being pushed into the die. The chute side walls are preferably planar at their portion closest the dies. The chute 32 is pitched so as to permit the force of gravity to feed the workpiece toward the dies. The chute is preferably pitched at an angle of 27 to 35 degrees with respect to the surface supporting the frame.

In order to place the workpiece 35 into the dies 10 and 12 from the chute 32, there is provided an injecting mechanism shown at 36 and a starter mechanism shown at 37. The injector mechanism 36 serves to cut a workpiece 35 out of the chute 32, close the chute and present the blank 35 to the starter mechanism 37. Thereafter the starter mechanism 37 pushes the workpiece between the dies and subsequently the die 12 is moved (to the right of FIG. 3) to cause the threads to be formed on the workpiece. Thereafter the workpiece is permitted to exit from the dies of the machine in a manner known in the prior art.

The timing of the injector mechanism 36 and the starter mechanism 37 is controlled by the provision of a first gear 40 mounted on the shaft 18 which in turn drives an idler gear 41. The idler gear 41 in turn drives a third gear 42 mounted on a shaft 43. Positioned on shaft 43 is an injection mechanism cam 44 and a starter mechanism cam 45. As the cams 44 and 45 are rotated, the injector mechanism and the pusher mechanism, 36 and 37 respectively, will be operated in timed relationship with respect to each other.

The injecting mechanism 36 more particularly comprises an injector finger 50 which is supported by a sliding member 51 which in turn is actuated by a pivotally mounted lever 54. The lever 54 has a cam follower 55 mounted thereon which engages the cam 44. As gear 42 rotates, finger 50 will be driven downwardly as the lever 54 pivots. This causes the chute 32 to be cut off and prevent a workpiece from entering into a position to be placed in the dies 10 and 12. As gear 42 continues to rotate, the finger 50 will be lifted to permit a blank 35 to exit from the chute 32 and be forced into the dies 10 and 12.

The starter mechanism 37, on the other hand, comprises a starter finger 58 mounted on a frame-supported slide 59, from which slide a slot 60 is cut out and into which a spring-loaded pin 61 and a stop 62 extend. A pivotally mounted lever 63 is positioned in the slot 60 and is movable by the action of a pivotally mounted lever 65 adjustably supported by a member 65a. The lever 65 is acted against by yet another pivotally mounted lever 66. The lever 66 has a cam follower 67 which engages the starter cam 45. The starter finger 58 is moved in toward the dies by the action of a spring-loaded pin 68 acting against the lever 63. Thus, as cam 45 rotates, the lever 66 will be pivoted in such a manner that the lever 63 will cause the starter finger 58 to be forced in a direction to position a workpiece 35 between the dies 10 and 12. As the cam 45 continues to rotate, the lever 63 will pivot against a stop 62 to cause finger 58 to be retracted.

Figure 4:
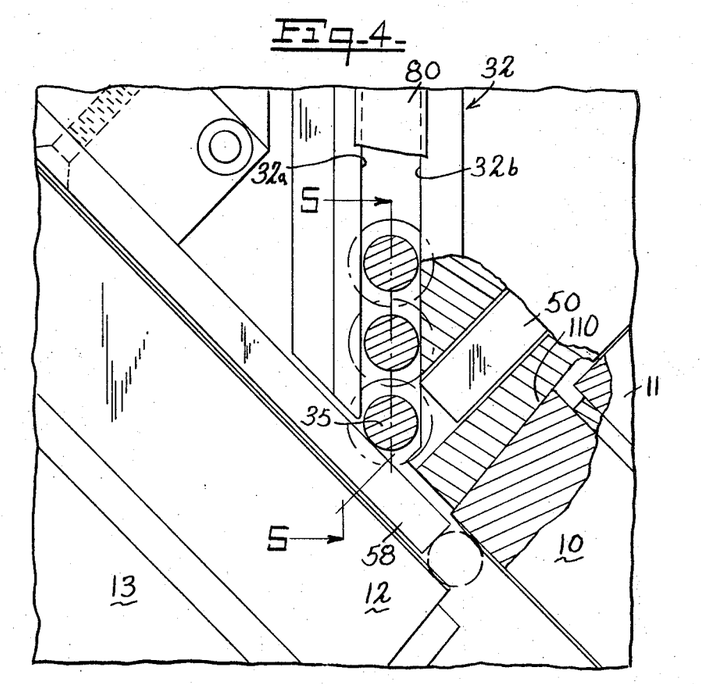
FIG. 4 is an enlarged portion of FIG. 3.
Figure 5:
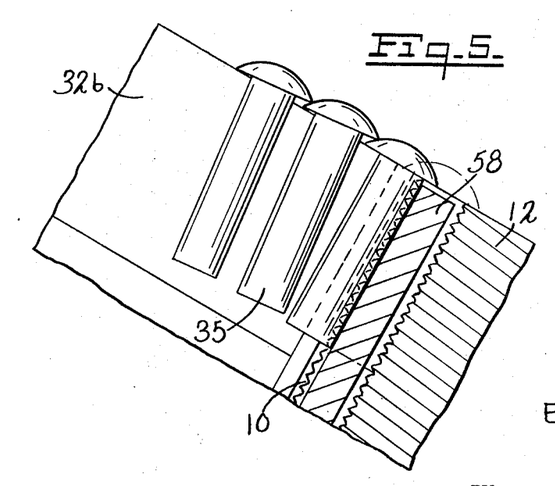
FIG. 5 is a sectional view taken along line 5—5 of FIG. 4.

Referring now to FIGS. 4 and 5, there is shown the blank 35 in the chute 32, as well as being pushed by the finger 58 into position between the dies 10 and 12. These is also shown the injector finger 50 positioned for permitting the workpiece 35 to leave the chute 32. The chute walls shown at 32a and 32b are so arranged that the shafts of the workpiece 35 will be parallel to a plane which is parallel to the direction of gravity. In this manner there will be no side bending of the workpiece while it is in the chute 32. In FIG. 5 there is shown the manner in which the workpiece lies on the top of the chute ready to fall down through the chute to be positioned within the dies 10 and 12. As may be seen, as it approaches the end of the chute the workpiece is aligned prior to its being pushed into the dies.

Figure 6:
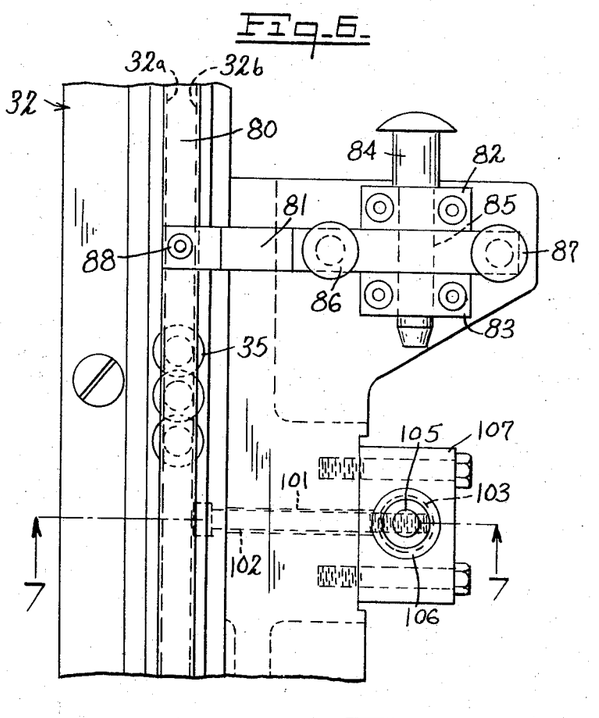
FIG. 6 is another enlarged portion of FIG. 3 showing the means for adjusting the chute means for presenting a workpiece to the dies.
Figure 7:
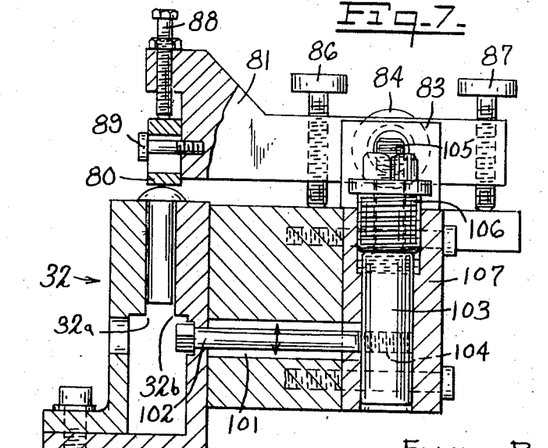
FIG. 7 is a sectional view taken along line 7—7 of FIG. 6.

With reference to FIGS. 6 and 7, there is shown the mechanism provided for adjusting the position of the chute with respect to the frame 10 and, further, for providing adjustment of the chute cover with respect to the chute to permit different sized capped workpieces to enter the chute. The cover of the chute is shown at 80 and is mounted on an arm 81 which is pivotally supported from the frame 9 by the provision of two blocks 82 and 83. The arm 81 is pivotally supported by a pin 84 positioned in a bore 85 in the arm. The pin 84 is supported by the two blocks 82 and 83. In order to adjust the height of the cover 80, two set screws 86 and 87 are provided which may be selectively adjusted to raise or lower arm 81 about its pivot point. The cover may also be adjusted by the positioning of another set screw 88 and by the loosening of a screw 89 supporting the cover 80 on the arm 81.

Again referring to FIGS. 6 and 7 as well as FIG. 3, there is shown the means for adjusting the position of the chute with respect to the frame 9. There is provided within the frame 9 a bore 101 through which a bolt 102 passes and engages the side 32b of the chute. The bolt 102 is threadably engageable with a bolt 103 having a threaded bore 104 therein. The bolt 103 is reduced at 105 and passes through a collar 106 which is threadably engaged in a member 107 supported on the frame 9. By loosening the bolt 102 from the bolt 103, the collar 106 may be adjusted within the support 107 such that bolt 103 may be lowered or raised within the support 107. Thereafter, bolt 102 may be tightened to secure the chute 32 to the bolt 103. Additionally there is provided a similar means 108 as described above for raising and lowering the other end of the chute.

Figure 8:
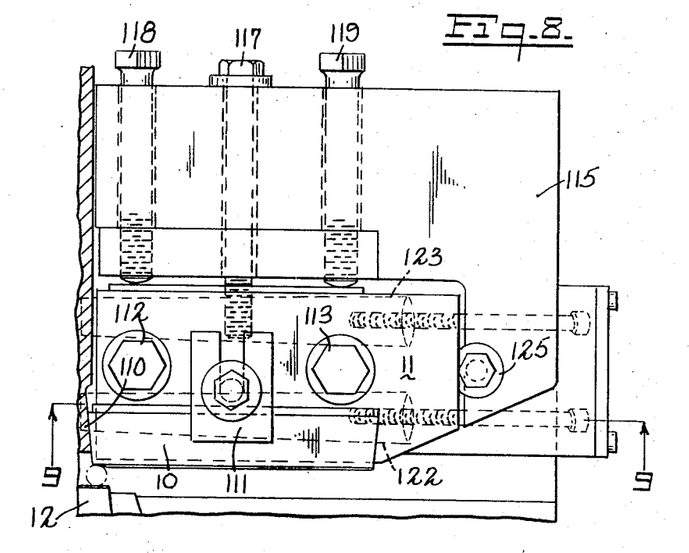
FIG. 8 is an enlarged top portion showing the means for positioning the stationary die according to the invention.
Figure 9:
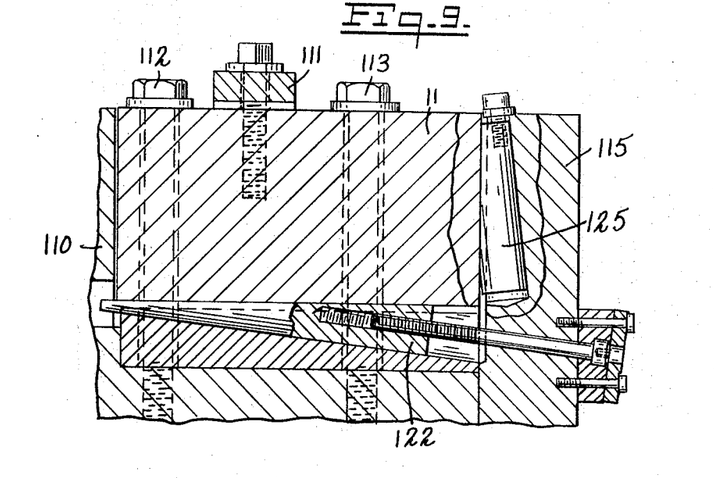
FIG. 9 is a sectional view taken along line 9—9 of FIG. 8.

Referring more particularly now to FIGS. 8 and 9 there is shown, in an enlarged diagram, means including the die block 11 for positioning and holding the stationary die 10. As may be clearly seen in FIGS. 8 and 9, the die 10 is wedged between a frame member 110 positioned adjacent the chute and the die block 11. The die 10 is held in place within the die block 11 by the provision of a clamp 111. By wedging the die 10 as described, any variation in length of the die within its acceptable tolerance is corrected since the die 10 is always set in a precise location. The die block 11 is held in place against the machine frame by the provision of two bolts shown at 112 and 113, respectively. The die block 11 is positioned within a frame member 115 in another direction by the provision of bolts 117–119. By adjusting these bolts, the die 10 can be correctly positioned with respect to the moving die 12. The die block 11 is also securely locked in place against the bolts 112 and 113 by a pair of adjustably positioned wedge members shown at 122 and 123, respectively. In addition, the die block 11 and the die 10 are pushed against the frame member 110 by the action of another adjustable wedge member shown at 125. As may be seen, the die block is locked in place in two directions by wedges and is held downwardly by bolts 117–119.

Figure 10:
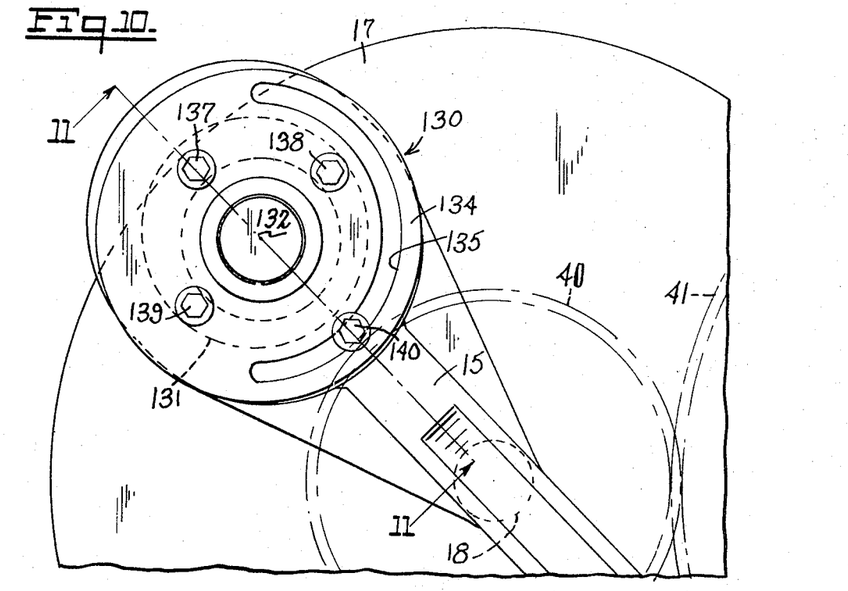
FIG. 10 is an enlarged top plan view of means for adjusting the pitman of FIG. 3 according to this invention.
Figure 11:
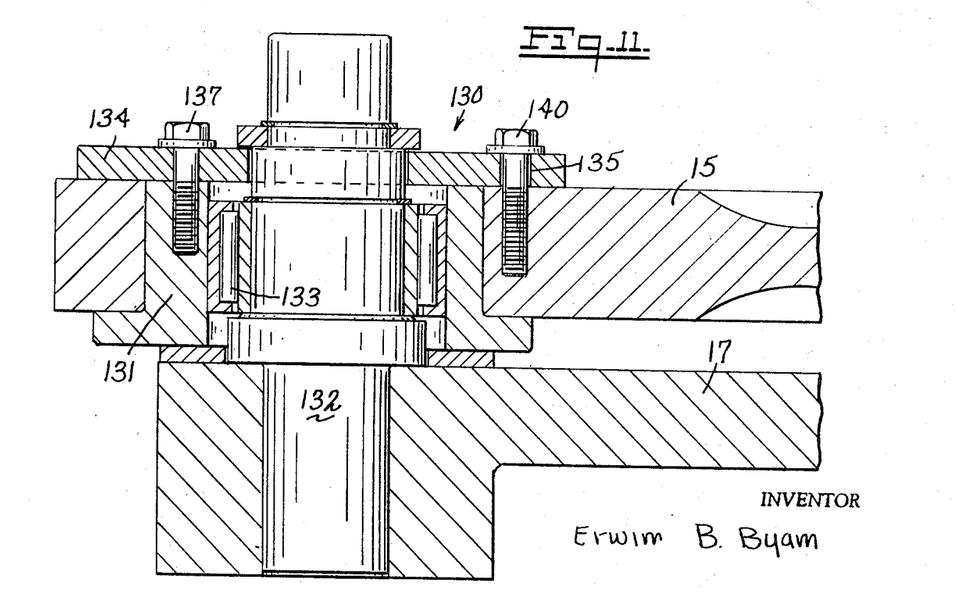
FIG. 11 is a sectional view taken along line 11—11 of FIG. 10.

Referring now to FIGS. 10 and 11, there is shown means for adjusting the position of the pitman 15 in order to set the position of the moving die 12 with respect to the stationary die 10. The mechanism for adjusting the pitman 15 is shown at 130 and comprises an eccentric sleeve 131 positioned about a pivot pin 132 and separated therefrom by a bearing assembly shown at 133. There is positioned on top of sleeve 131 a plate 134 having a slot 135 formed therein. The plate 134 is secured to the sleeve 131 by bolts shown at 137–139. The pitman is secured to the plate by the provision of a bolt 140 movable in slot 135. By loosening the bolts 137–140, the eccentric sleeve 131 may be rotated to shift the position of the pitman 15, as shown by the arrows in FIG. 10. Thereafter the bolt 140 is first tightened to hold the position of the pitman 15 and then bolts 137–139 are tightened to lock the pitman in place.

Figure 12:
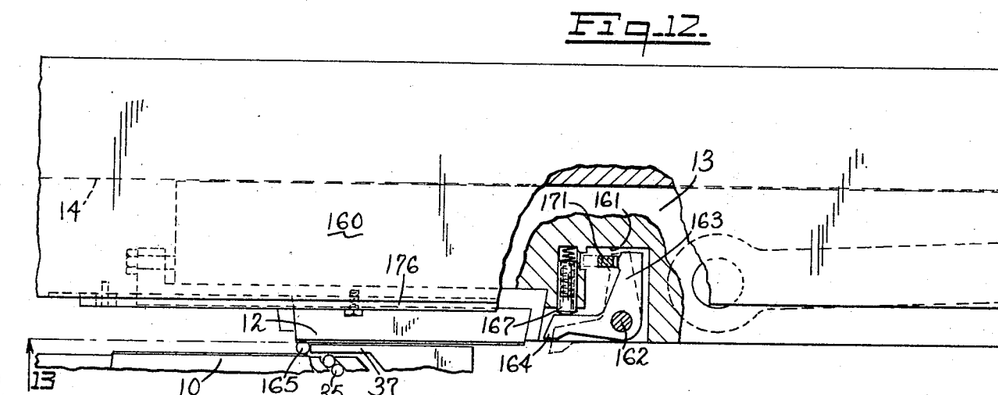
FIG. 12 is a top view partially in section of an alternate embodiment of the invention showing means for ejecting workpieces which may become lodged between the dies.
Figure 13:
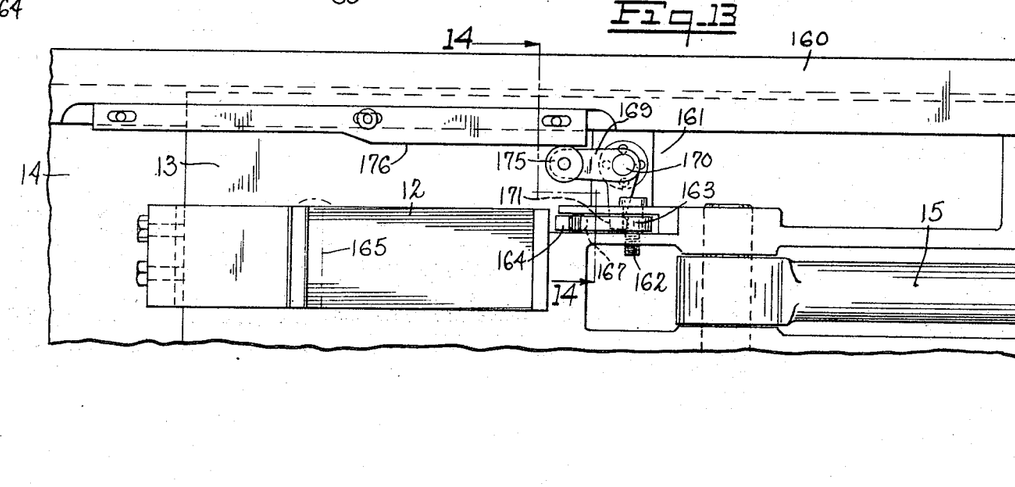
FIG. 13 is a side view taken from line 13—13 of FIG. 12.
Figure 14:
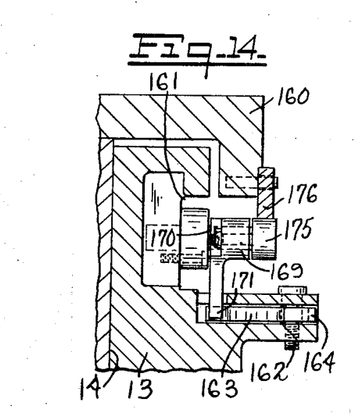
FIG. 14 is a sectional view taken along line 14—14 of FIG. 13.

With reference now to FIGS. 12–14, there is shown an alternate embodiment of the invention which includes means for ejecting a workpiece which may become lodged between the dies during rolling. The numbers for the parts mentioned below are the same as described with reference to FIGS. 1–11. The stationary die of the thread roller machine is shown at 10 and the moving die 12 is shown supported by the gate 13. The gate 13 is driven by the pitman 15 within a gate cap shown at 160. Formed within the gate 13 is a recess 161 in which is pivotally supported at 162 a lever 163. The lever 163 has a portion 164 which functions to force a workpiece 165 out of dies 10 and 12. In the event the workpiece becomes lodged during rolling, the lever 163 is forced in a direction to eject the workpiece by the provision of a spring biased rod 167. The lever 163 is also controlled by a bellcrank 169 pivotally supported by the gate 13 at 170. The bellcrank 169 includes a portion 171 thereof which engages lever 163 to force it above the die face of the movable die 12. The bellcrank 169 also includes a roller 175 which is controlled by a cam 176 mounted on the gate cap 160. The cam 176 is of a shape such that on the forward stroke of the movable die 12, the lever portion 164 is held above the face of die 12 until the starter mechanism 37 is cleared. Thereafter, the lever portion 164 is forced downwardly by the rod 167 to eject a workpiece which may be lodged between the dies. During the reverse stroke of the die 12, the lever portion 164 is again raised to clear the mechanism 37.

As will be observed, this invention provides means for guiding a workpiece into position for pushing into a pair of dies. The chute means directs the workpiece in a manner such that the workpiece is in a plane parallel to the plane of gravity when the machine is positioned on its supporting surface. It will also be noted that the tops of the chute, dies and starter will all lie preferably in substantially the same plane and thus reduce the time element required to push a workpiece into the dies.

It will thus be seen that the objects set forth above, among those made apparent from the preceding description, are efficiently attained and since certain changes may be made in the above construction without departing from the spirit and scope of the invention, it is intended that all matter contained in the foregoing description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:
1. A thread roller machine for machining a workpiece between first and second dies, comprising a frame, means for stationarily supporting said first die on said frame, means for supporting said second die on said frame for movement across said first die, a chute whose axis lies in a straight line and is positioned on said frame to provide workpieces to said dies from one end thereof, and means for positioning the top surfaces of the chute on which the head of the workpiece rides in substantially the same plane as the top surfaces of the dies, wherein said chute has planar side walls, and wherein the planes of the side walls and the plane passing through the axes of the workpieces are parallel and vertical, and wherein the axis of said chute is positioned at an angle of between 30 to 60 degrees with respect to the die line of the dies and the top surfaces of the chute are pitched at an angle of about 27 to 35 degrees with respect to the horizontal.

2. A thread roller machine according to claim 1, further including starter means for forcing a workpiece into said dies as well as providing injector means for forcing a workpiece out of said chute so as to close said chute and position a workpiece against said second die, said injector means positioned at substantially right angles with respect to said starter means, both said injector means and said starter means positioned at substantially a 30 to 60 degree angle with respect to the axis of the chute.

3. A thread roller machine for machining a workpiece between first and second dies, comprising a frame, means for stationarily supporting said first die on said frame, means for supporting said second die on said frame for movement across said first die, a chute whose axis lies in a straight line and is positioned on said frame to provide workpieces to said dies from one end thereof, and means for positioning the top surfaces of the chute on which the head of the workpiece rides in substantially the same plane as the top surfaces of the dies, wherein said chute has planar side walls, and wherein the planes of the side walls and the plane passing through the axes of the workpieces are parallel and vertical, and including a chute cover, an arm supporting the chute cover, support means mounted on the frame, a pin supported by the support means, said pin pivotally supporting said arm, and a plurality of set screws supported by said arm and positioned on both sides of said pin for adjusting the position of the cover with respect to the top of the chute.

4. A thread roller machine for machining a workpiece between first and second dies, comprising a frame, means for stationarily supporting said first die on said frame, means for supporting said second die on said frame for movement across said first die, a chute whose axis lies in a straight line and is positioned on said frame to provide workpieces to said dies from one end thereof, and means for positioning the top surfaces of the chute on which the head of the workpiece rides in substantially the same plane as the top surfaces of the dies, wherein said chute has planar side walls, and wherein the planes of the side walls and the plane passing through the axes of the workpieces are parallel and vertical, and in which the means for supporting the first die comprises a die block, a first frame member supported by said frame for supporting said die block, and wedge means provided on said first frame member for forcing said first die and said die block against a second frame member positioned adjacent said chute in order to compensate for variations in length of the first die and to prevent damage to the chute.

5. A thread roller machine for machining a workpiece between first and second dies, comprising a frame, means for stationarily supporting said first die on said frame, means for supporting said second die on said frame for movement across said first die, a chute whose axis lies in a straight line and is positioned on said frame to provide workpieces to said dies from one end thereof, and means for positioning the top surfaces of the chute on which the head of the workpiece rides in substantially the same plane as the top surfaces of the dies, wherein said chute has planar side walls, and wherein the planes of the side walls and the plane passing through the axes of the workpieces are parallel and vertical, and including means for moving said second die across said first die, said means including a pitman for driving said means supporting said second die, said pitman supported at one end about an eccentric sleeve, said sleeve positioned about a pin, a plate positioned on said sleeve and said pitman and about said pin, said plate having a slot formed therein, a bolt positionable in said slot and coupled to said pitman, and means securing said plate to said sleeve whereby the position of said second die with respect to said first die may be adjusted by moving said sleeve relative to said pitman.

6. A thread roller machine for machining workpieces between first and second dies, comprising a frame, means for stationarily supporting said first die on said frame, means for supporting said second die on said frame for movement across said first die, a chute whose axis lies in a straight line and is positioned on said frame to provide workpieces to said dies from one end thereof, and means for positioning the top surfaces of the chute on which the head of the workpiece rides in substantially the same plane as the top surfaces of the dies, wherein said chute has planar side walls, and wherein the planes of the side walls and the plane passing through the axes of the workpieces are parallel and vertical, and wherein the axis of said chute is positioned at an angle of between 30 to 60 degrees with respect to the die line of the dies and the top surfaces of the chute are pitched at an angle of about 27 to 35 degrees with respect to the horizontal, further including starter means for forcing a workpiece into the dies and injector means for forcing a workpiece from said chute so as to close said chute and position said workpiece against said second die, in which said starter means includes a slide slidably supported within a frame member means, a slot formed within said slide, a bore formed within a portion of the slide adjacent said slot and having a resiliently biased pin supported therein, stop means supported by said slide and adjacent said slot, a pivotally mounted first lever supported by said frame member means and having an end thereof extending into said slide slot to engage said stop means and said pin, resiliently biased means urging said first lever toward said pin, a second lever pivotally supported by a member adjustably supported in said frame member means, said second lever having one end thereof for engaging said first lever to urge it against said stop means, a third pivotally mounted lever supported by said frame member means and having a portion thereof engaging another end of said second lever, and means supported by an end of said third lever for engaging a drive means.

7. A mechanism comprising a member mounted for movement in two directions, said member having a cut-out formed therein adjacent its two ends, pin means resiliently supported by said member and extending into said cut-out, a first pivotally mounted lever having one end thereof for engaging said pin means, resiliently biased means urging said lever against said pin means, a second lever pivotally mounted about two ends thereof, one of said ends engaging said first lever to urge it toward the opposite side of the cut-out away from the pin means, and a third pivotally mounted lever for engaging the other end of said second lever to rotate it about its pivot point.

8. A thread roller machine for machining workpieces between first and second dies, comprising a frame, means for stationarily supporting said first die on said frame, means for supporting said second die on said frame for movement across said first die, a chute whose axis lies in a straight line and is positioned on said frame to provide workpieces to said dies from one end thereof, and means for positioning the top surfaces of the chute on which the head of the workpiece rides in substantially the same plane as the top surfaces of the dies, wherein said chute has planar side walls, and wherein the planes of the side walls and the plane passing through the axes of the workpieces are parallel and vertical, and further including mechanical ejecting means supported by said means for supporting said second die, in which said means for supporting said second die comprises a gate, said gate pivotally supporting said ejecting means, a gate cap supported by said frame, and cam means supported by said gate cap for controlling the operation of said ejecting means.

9. In a thread roller machine, a stationary die, a movable die, first means for moving the movable die across said stationary die, an ejecting means trailing but movable with said movable die, and cam means for controlling the operation of said ejecting means.

10. In a thread roller according to claim 9, including second means for pushing a workpiece between said dies, and wherein said cam is shaped to raise said ejecting mechanism until said ejecting mechanism passes over said second means.

References Cited

UNITED STATES PATENTS

| | | | |
|---|---|---|---|
| 2,244,622 | 6/1941 | Johns | 72—90 |
| 3,139,776 | 7/1964 | Friedman | 72—90 |

MILTON S. MEHR, Primary Examiner

U.S. Cl. X.R.

10—4